C. W. HUNT, DEC'D.
K. H. HUNT, EXECUTRIX, AND C. W. HUNT AND G. S. HUMPHREY, EXECUTORS.
APPARATUS FOR FACILITATING THE DISTRIBUTION OF EXPRESS MATTER, &c.
APPLICATION FILED DEC. 30, 1910.
1,004,687.
Patented Oct. 3, 1911.
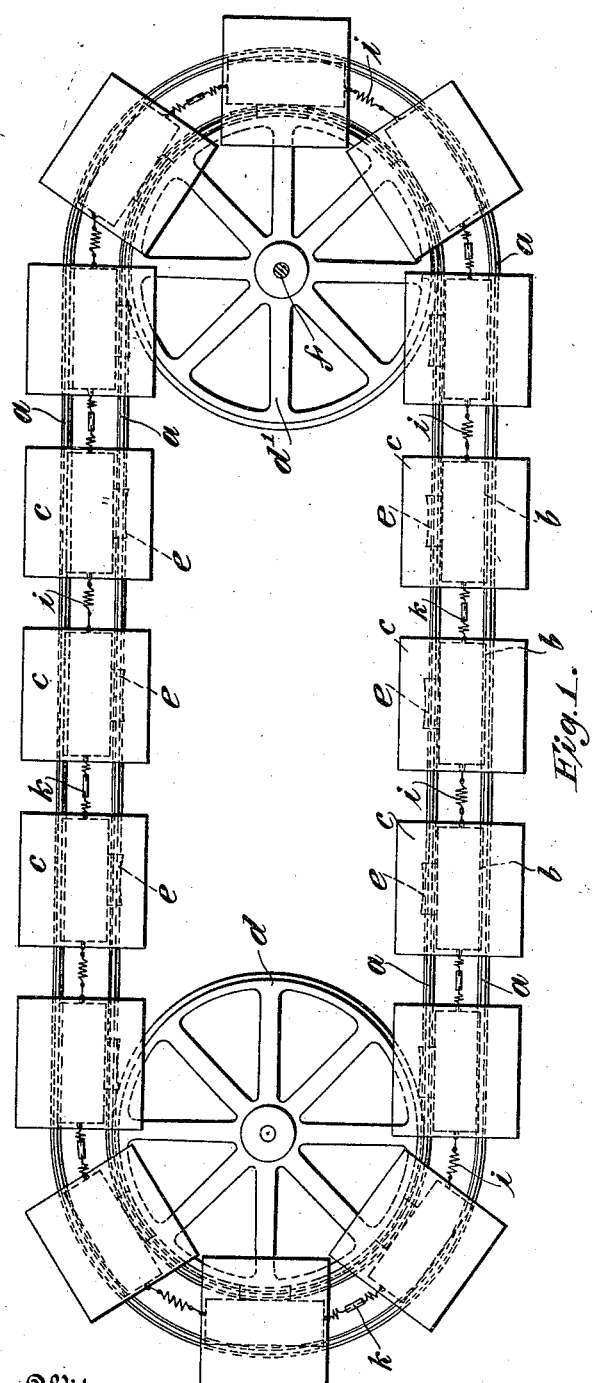
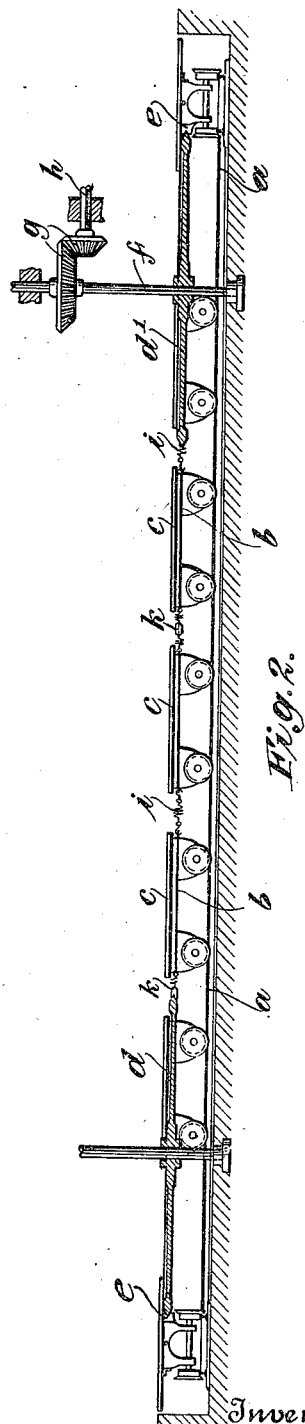

UNITED STATES PATENT OFFICE.

CHARLES W. HUNT, OF NEW YORK, N. Y.; KATHARINE H. HUNT EXECUTRIX AND CHARLES WALLACE HUNT AND GEORGE S. HUMPHREY EXECUTORS OF SAID CHARLES W. HUNT, DECEASED.

APPARATUS FOR FACILITATING THE DISTRIBUTION OF EXPRESS MATTER, &c.

1,004,687. Specification of Letters Patent. Patented Oct. 3, 1911.

Application filed December 30, 1910. Serial No. 600,004.

*To all whom it may concern:*

Be it known that I, CHARLES WALLACE HUNT, a citizen of the United States, and a resident of Stapleton, in the borough of Richmond of the city of New York, in the State of New York, have invented certain new and useful Improvements in Apparatus for Facilitating the Distribution of Express Matter, &c., of which the following is a specification, reference being had to the accompanying drawing, forming a part hereof.

This invention relates to apparatus such as is used in the handling and distribution of goods of various kinds, in which a series of cars or trucks, mounted upon a circular or other endless railway, and forming an endless series of cars, upon which the goods may be placed at any point and from which they may be removed at any point or upon which they may be permitted to remain until such time as they may be removed conveniently. In order that such an apparatus may be operated with the utmost efficiency and that the series of cars or trucks may be driven frictionally without requiring exact spacing, it is desirable that a substantially constant tension be maintained upon the series of cars.

It is the object of this invention to accomplish this result and in accordance therewith there are provided between the cars variable couplings by which the slack in the series of cars shall be taken up either automatically or by adjustment so that the necessary frictional contact with the driving wheel shall be maintained.

The invention will be more fully explained hereinafter with reference to the accompanying drawing in which it is illustrated and in which—

Figure 1 is a top view, and Fig. 2 is a view in longitudinal section showing so much of the improved apparatus as is necessary to enable the application of the invention to be understood.

Upon the endless track $a$ are mounted cars or trucks $b$ which are coupled together to form an endless series of cars, the tops $c$ being adapted for the reception of goods. At the curves or bends of the track are placed horizontal guide wheels or pulleys $d$, $d'$, about which the series of cars travels, each car being provided with a concaved bearing block $e$ for contact with the guide and driving wheels $d$ and $d'$. One or both of the guide wheels, as $d'$, may be rotated by any convenient means, indicated by a vertical shaft $f$, bevel gears $g$ and the shaft $h$, so that the endless series of cars is kept in continuous movement through frictional driving contact with the driving wheel. In order that the frictional contact between the series of cars and the driving wheel may be great enough to insure the proper driving of the series of cars, the blocks $e$ may be grooved longitudinally with a V-shaped groove and the rim of the wheel formed correspondingly or vice versa. Through such frictional driving of the series of cars it is not essential that the cars shall be uniformly spaced apart or that they shall conform exactly to the face of the driving wheel. It is necessary, however, that means shall be provided whereby the necessary tension of the series of cars or trucks shall be maintained constantly so that a sufficient driving contact shall be secured at all times. To this end variable couplings are provided between the cars. Such couplings may either take up the slack automatically or they may be adjusted from time to time so as to take up the slack. Preferably both forms of variable couplings are employed between different cars of the series. Thus some of the couplings between the cars may consist each of a suitably stiff spiral or other spring $i$ which, being always under tension, serves to take up the slack of the series of cars and thereby to maintain the necessary tension. Another or others of the couplings may consist each of a turn buckle, as indicated at $k$, or a turn buckle and a spring, so that if undue slack, which cannot be taken up by the spring couplings, develops in the use of the apparatus, such slack may be taken up from time to time by adjustment of the turn buckles.

I claim as my invention:

1. An apparatus of the character described, comprising an endless track, an endless series of cars mounted on said track, frictional driving means to move the cars, and variable spring couplings between the cars whereby frictional driving contact between the car and the driving means is maintained.

2. An apparatus of the character described, comprising an endless track, an endless series of cars mounted on said track, means to move the cars, and variable spring couplings between some of the cars and manually adjustable variable couplings between others of the cars.

3. An apparatus of the character described, comprising an endless track, an endless series of cars mounted on said track and a frictional driving wheel located at a bend of the track by which the series of cars is driven through frictional contact.

4. An apparatus of the character described, comprising an endless track, a frictional driving wheel located at a bend of the track, an endless series of cars mounted on said track and having frictional driving contact with said wheel, and variable couplings between the cars.

5. An apparatus of the character described, comprising an endless track, a frictional driving wheel located at a bend of the track, an endless series of cars mounted on said track and having frictional driving contact with said wheel, and variable spring couplings between the cars.

6. An apparatus of the character described, comprising an endless track, a frictional driving wheel located at a bend of the track, an endless series of cars mounted on said track and having frictional driving contact with said wheel, and manually adjustable variable couplings between the cars.

7. An apparatus of the character described, comprising an endless track, a frictional driving wheel located at a bend of the track, an endless series of cars mounted on said track and having frictional driving contact with said wheel and variable spring couplings between some of the cars and manually adjustable variable couplings between others of the cars.

This specification signed and witnessed this 27th day of Dec. A. D. 1910.

CHAS. W. HUNT.

Signed in the presence of—
CHARLES HUMPHREY,
W. L. VOORHIS.

---

Copies of this patent may be obtained for five cents each, by addressing the "Commissioner of Patents, Washington, D. C."